United States Patent
Kawai et al.

[11] Patent Number: 5,216,895
[45] Date of Patent: Jun. 8, 1993

[54] ENGINE IDLE SPEED CONTROL SYSTEM FOR AUTOMOTIVE VEHICLE

[75] Inventors: Nobuyuki Kawai, Fujisawa; Ikutaro Noji, Yokohama; Makoto Fukubayashi, Zama; Shozo Nakayama; Naoki Nakada, both of Yokohama; Kazuhiro Ishigami, Sagamihara; Kazuya Takahashi, Yokosuka, all of Japan

[73] Assignee: Nissan Motor Co., Ltd., Japan

[21] Appl. No.: 940,135

[22] Filed: Sep. 3, 1992

[30] Foreign Application Priority Data

Sep. 12, 1991 [JP] Japan .................. 3-261141

[51] Int. Cl.$^5$ .............................................. B60H 1/32
[52] U.S. Cl. .................. 62/133; 62/228.4; 62/243; 123/339
[58] Field of Search ............ 62/133, 228.1, 228.4, 62/228.5, 323.1, 323.4, 157, 158, 231, 150, 239, 243, 226, 227, 229, 215; 165/43; 123/339

[56] References Cited

U.S. PATENT DOCUMENTS

| | | | |
|---|---|---|---|
| 4,488,411 | 12/1984 | Hara | 62/133 |
| 4,856,291 | 8/1989 | Takahashi | 62/228.4 |
| 4,898,005 | 2/1990 | Sakurai | 62/323.4 |
| 4,926,651 | 5/1990 | Noguchi | 62/133 |
| 5,018,362 | 5/1991 | Nagase et al. | 62/133 |
| 5,163,399 | 11/1992 | Bolander et al. | 123/339 |

FOREIGN PATENT DOCUMENTS 1-254418  10/1989  Japan .

OTHER PUBLICATIONS

Nissan Service Weekly, PB-71, No. 578, Jun. 1987, pp. E-83 to E-88.

Primary Examiner—Harry B. Tanner
Attorney, Agent, or Firm—Lowe, Price, LeBlanc & Becker

[57] ABSTRACT

In an engine idle speed control system associated with an air conditioner provided with an evaporator for evaporating a refrigerant compressed by a compressor actuated or deactuated by an engine near an evaporator freeze limit temperature, the engine idle speed is increased under consideration of thermal load applied to the compressor whenever the compressor is being actuated. The compressor 21 is deactuated when the temperature of air having passed through the evaporator 22 drops below a predetermined value, and actuated when the same temperature rises beyond another higher predetermined value. Whenever the compressor 21 has been deactuated, the time interval between the deactuation and the actuation of the compressor is measured. If the measured time interval is relatively short, since this indicates a relatively high thermal load applied to the compressor, the engine idle speed is increased. However, if the measured time interval is relatively long, since this indicates a relatively low thermal load, the engine idle speed is not increased, thus improving the fuel consumption rate and the compressor durability without frequently actuating and deactuating the compressor.

9 Claims, 6 Drawing Sheets

ENGINE IDLE SPEED CONTROL SYSTEM FOR AUTOMOTIVE VEHICLE

BACKGROUND OF THE INVENTION

1. Field of the Invention

The present invention relates to an engine idle speed control system for an automotive vehicle provided with an air conditioner.

2. Description of the Prior Art

An air conditioning apparatus such that dehumidification performance can be improved at low external temperatures below a predetermined value is well known, as disclosed in Japanese Published Unexamined (Kokai) Patent Application No. 1-254418.

Figure 6:
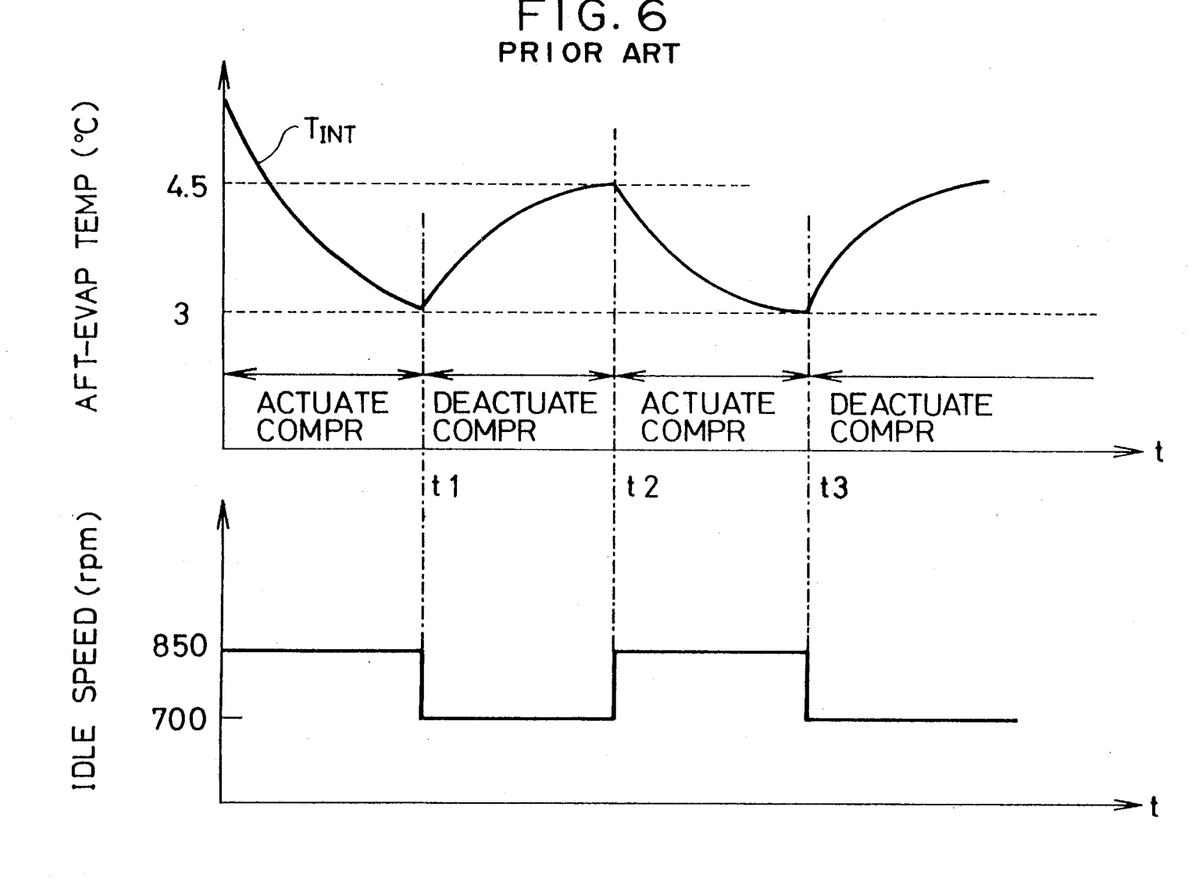
FIG. 6 is a timing chart for assistance in explaining the operation of a prior-art engine idle speed control apparatus.

The above-mentioned control system is referred to as constant temperature demist control. In this constant temperature demist control in an air conditioning apparatus using a compressor of fixed capacity type as shown in FIG. 6, the compressor is deactuated when the temperature $T_{INT}$ of air having passed through an evaporator (referred to as after-evaporator temperature, hereinafter) drops down to a low temperature (e.g., 3° C. at which the evaporator starts to be frozen) (at the time $t_1$) and actuated again when the after-evaporator temperature $T_{INT}$ rises up to another higher temperature (e.g. 4.5° C.) (at the time $t_2$) That is, the dehumidification performance can be improved at low temperatures by actuating the compressor near the utmost possible limit where the evaporator is not frozen.

On the other hand, in an automotive vehicle on which the air conditioning apparatus as described above is mounted, an auxiliary air control valve (referred to as AAC valve) for controlling the flow rate of auxiliary intake air, for instance is disposed at an air passage which bypasses a throttle valve, so that engine idle speed can be increased by opening the AAC value to a predetermined opening rate when the compressor is being actuated (at the time interval between $t_2$ and $t_3$ as shown in FIG. 6), as disclosed by NISSAN SERVICE WEEKLY, PB-71, No. 578, June, 1987.

In the above-mentioned prior-art engine idle speed control apparatus, the engine idle speed is increased whenever the compressor is being actuated, even under the condition that the thermal load applied to the compressor is relatively low and therefore the time intervals from when the compressor is deactuated to when actuated again are relatively long. Therefore, there exists a problem is that fuel consumption rate is high, because the engine idle speed is often increased, in spite of the fact that a sufficient cooling performance can be usually obtained.

In this connection, the above-mentioned NISSAN SERVICE WEEKLY discloses such an example that the idle speed is determined at a lower value (e.g. 600 rpm) when the after-evaporator temperature $T_{INT}$ is lower than a predetermined value (e.g. 8° C.) and at a higher value (e.g. 875 rpm) when TINT is higher than the predetermined value (e.g. 8° C.), whenever the evaporator is being actuated. In the prior-art control method as described above, however, since the engine idle speed is increased whenever the compressor is being actuated after the after-evaporator temperature $T_{INT}$ has risen beyond a predetermined value, irrespective of the thermal load applied to the compressor, there still exists a problem is that the fuel consumption rate is inevitably increased.

In addition, when the engine idle speed is increased under low thermal load, since the after-evaporator temperature drops quickly down to the evaporator freeze start temperature, the compressor is more frequently actuated and deactuated, thus resulting in another problem in that the durability of the compressor is deteriorated.

SUMMARY OF THE INVENTION

With these problems in mind, therefore, it is the primary object of the present invention to provide an engine idle speed control system for an automotive vehicle provided with an air conditioning apparatus having a compressor actuated or deactuated by an engine near an evaporator freeze limit temperature, which can improve the fuel consumption rate and the compressor durability.

To achieve the above-mentioned object, the present invention provides an engine idle speed control system associated with an air conditioner provided with an evaporator for evaporating a refrigerant compressed by a compressor driven an engine, comprising: (a) detecting means for detecting temperature correlative to an evaporator freeze start temperature; (b) compressor control means for controlling compressor operation in such a way as not to compress the refrigerant when temperature detected by said detecting means drops belows a predetermined value and to compress the refrigerant when the detected temperature rises beyond the predetermined value; (c) idle speed control means for controlling the engine idle speed in such a way as to increase the engine idle speed, when said compressor control means controls the compressor operation so as to compress the refrigerant; (d) timer means for measuring a time interval from when the temperature detected by said detecting means drops below the predetermined value to when the detected temperature rises beyond the predetermined value; and (e) inhibiting means for inhibiting the engine idle speed from being increased by said idle speed control means when the time interval detected by said timer means exceeds a predetermined value, under the condition that the refrigerant is being compressed by the compressor.

Further, to achieve the above-mentioned object, the present invention provides a method of controlling engine idle speed of an engine associated with an air conditioner provided with an evaporator for evaporating a refrigerant compressed by a compressor driven by the engine, comprising the steps of: (a) detecting temperature of air having passed through the evaporator; (b) checking whether the detected temperature drops below a first predetermined temperature or rises beyond a second predetermined value higher than the first predetermined value; (c) if the detected temperature drops below the first predetermined value, deactuating the compressor; (d) checking whether the detected temperature has just dropped below the first predetermined value; (e) if the detected temperature has just dropped below the first predetermined value, starting a timer to measure time interval and further setting the engine idle speed to a lower speed; (f) if the detected temperature rises beyond the second predetermined value, actuating the compressor; (g) checking whether the detected temperature has just risen beyond the second predetermined value; (h) if the detected temperature has just risen beyond the second predetermined value, stopping the timer; (i) checking whether the time interval measured by the timer is more than a predetermine value; (j)

if the measured time interval is longer than the predetermined value, keeping the engine idle speed at the lower speed; and (k) if the measured time interval is the predetermined value or shorter, setting the engine idle speed to a higher speed.

In the engine idle speed control system according to the present invention, the engine idle speed is increased under due consideration of thermal load applied to the compressor whenever the compressor is being actuated. The compressor is deactuated when the after-evaporator temperature drops below a first predetermined value, and actuated again when the after-evaporator temperature rises beyond a second predetermined value. Whenever the compressor has been deactuated, the time interval between the deactuation and actuation of the compressor is measured. The thermal load is determined high when the time interval between the deactuation and actuation of the compressor is short, but determined low when the time interval is long. The engine idle speed is increased only when the compressor is being actuated under a relatively high thermal load, without increasing the engine idle speed under a relatively low thermal load, thus improving the fuel consumption rate and the compressor durability, without frequently actuating and deactuating the compressor.

DETAILED DESCRIPTION OF THE PREFERRED EMBODIMENT

Figure 1:
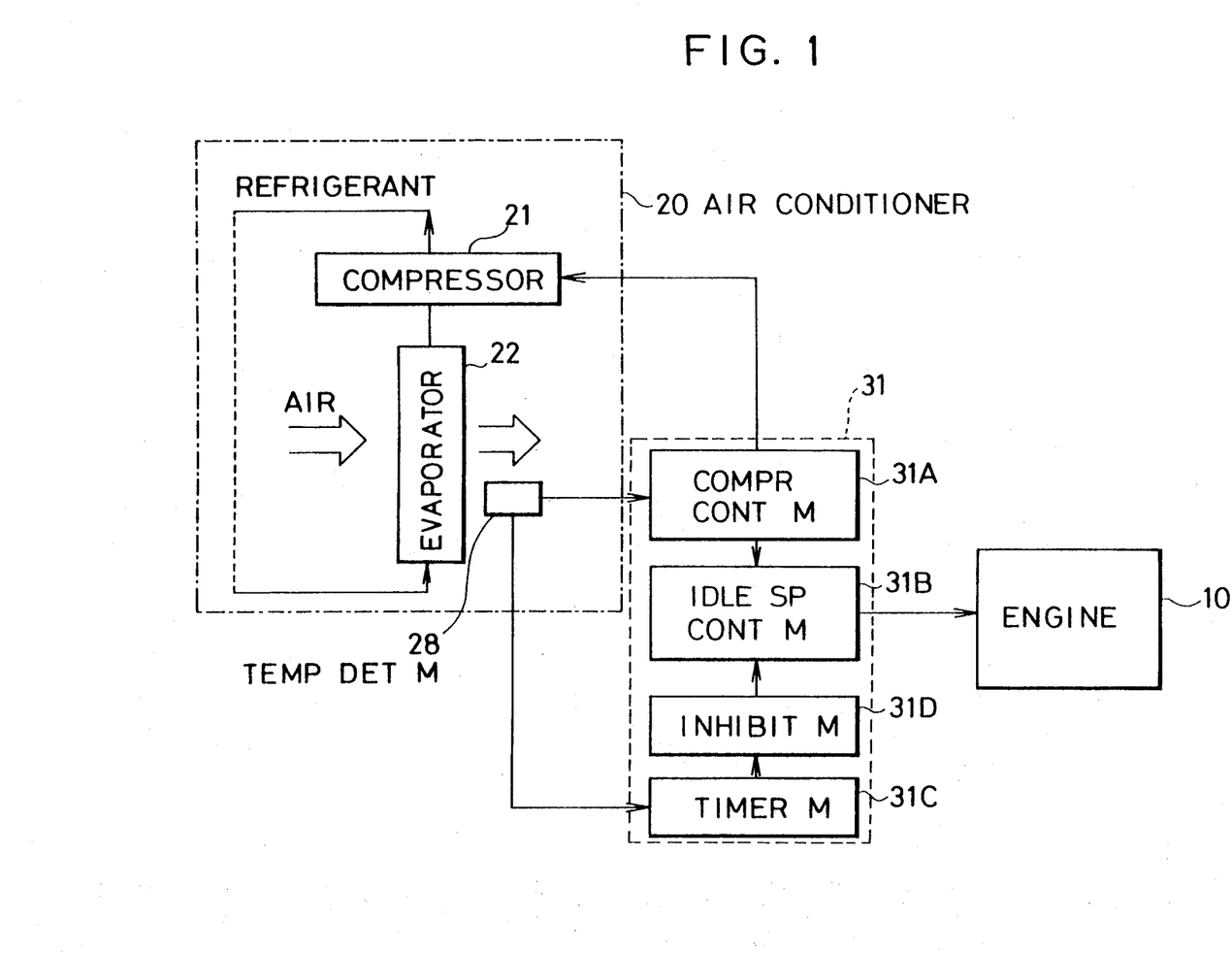
FIG. 1 is a schematic block diagram showing a conceptual configuration of the engine idle speed control system according to the present invention.

With reference to FIG. 1, a basic configuration of the engine idle speed control system according to the present invention will be described hereinbelow. The control system comprises an engine 10, an air conditioner 20 including a compressor 21, an evaporator 22 and a temperature detecting means 28, and control means 31 including compressor control means 31A, idle speed control means 31B, inhibiting means 31D and timer means 31C.

The evaporator 22 evaporates an refrigerant compressed by the compressor 21 to cool air passing through the evaporator 22. The temperature detecting means 28 detects a temperature correlated to a temperature at which the evaporator 22 beings to freeze. This temperature detecting means 28 is a sensor for detecting the temperature of air passing through the evaporator 22, for instance. The compressor control means 31A controls the operation of the compressor 21 in such a way that the refrigerant is not compressed by the compressor 21 when the temperature detected by the detecting means 28 is lower than a predetermined value, but the refrigerant is compressed when the temperature detected thereby is higher than another predetermined value. This compressor control means 31A is an electromagnetic clutch for controlling the amount of the refrigerant to be fed from the compressor 21 by engaging or disengaging the compressor 21 of fixed capacity type with or from compressor driving means (the engine 10, in this embodiment). The idle speed control means 31B discriminates the status as to whether the compressor 21 must feed the refrigerant, and increases the idle speed of the engine 10 when the compressor 21 is feeding the refrigerant. The timer means 31C measures time intervals from when the temperature detected by the detecting means 28 drops below a predetermined value to when the temperature rises beyond the predetermined value by setting and resetting the time measurement data. The inhibiting means 31D inhibits the engine idle speed from being increased by the idle speed control means 31B, when the time interval measured by the timer means 31C exceeds a predetermined value, even if the compressor 21 is feeding the refrigerant.

The time interval from when the compressor 21 is deactuated to when actuated again is indirectly measured with the timer means 31C, by detecting the change in temperature of air passing through the evaporator 22. When this detected time interval is relatively short, the thermal load applied to the compressor 21 is determined to be large, so that the engine idle speed is increased under the condition that the compressor 21 is feeding the refrigerant. On the other hand, when the detected time interval is relatively long, the thermal load applied to the compressor 21 is determined to be small, so that the engine idle speed is not increased by the inhibiting means 31D even when the compressor 21 is feeding the refrigerant, thus improving the fuel consumption rate when the engine idle speed is increased during the compressor operation.

Figure 2:
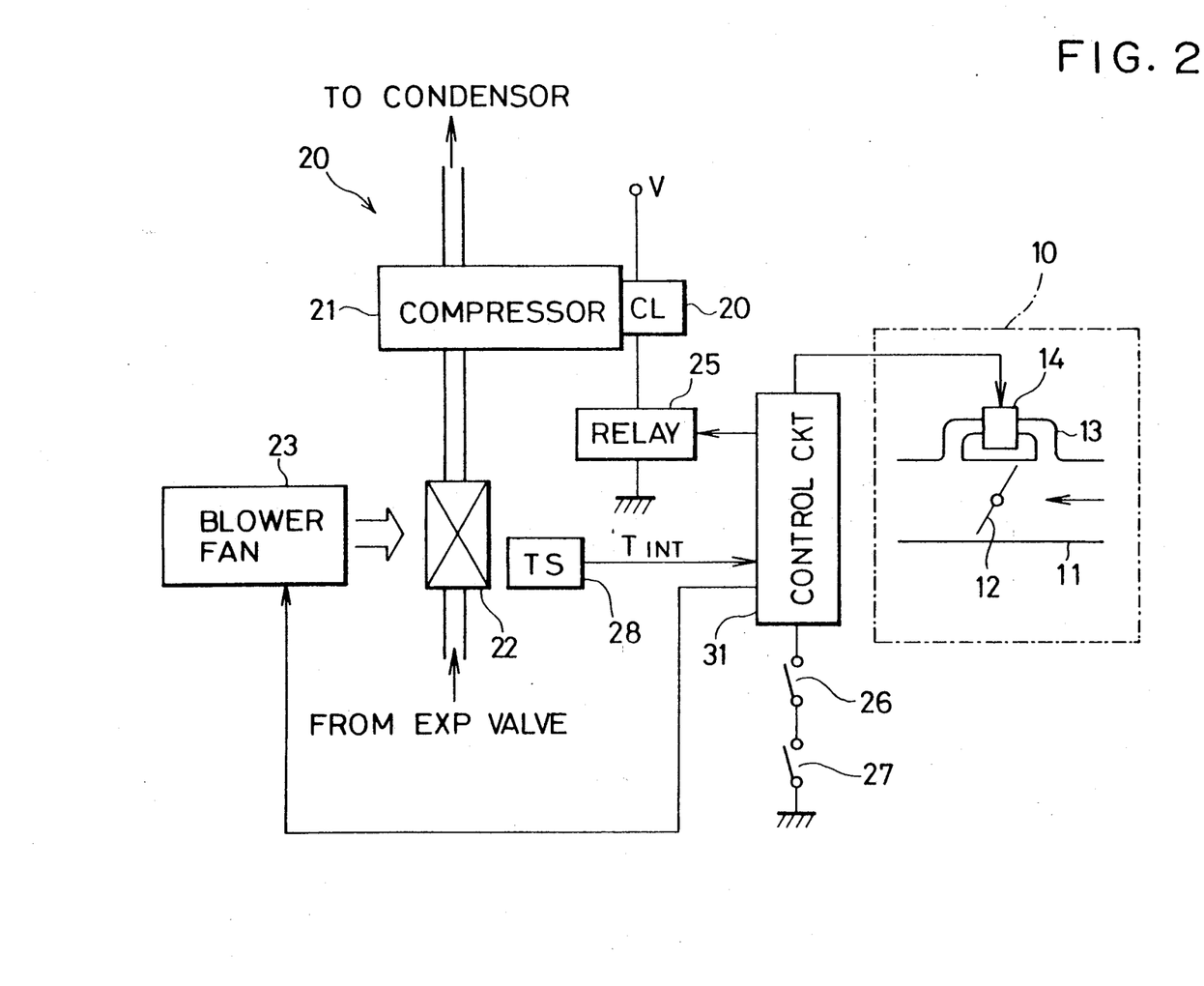
FIG. 2 is an illustration for assistance in explaining an embodiment of the control system according to the present invention.

FIG. 2 shows a practical embodiment of the idle speed control system according to the present invention. The control system roughly comprises an air conditioner 20, a temperature sensor 28, a control circuit 31, and an engine 10 including an auxiliary air flow rate control valve (referred to as AAC valve, hereinafter) 14. The air conditioner 20 includes a compressor 21 of fixed capacity type, an evaporator 22 for evaporating refrigerant compressed by the compressor 21 and fed through a condenser, a liquid tank and an expansion valve (all not shown) to cool air flowing therethrough, and a blower fan 23 for feeding air through the evaporator 22. An electromagnetic clutch 24 is provided for a shaft of the compressor 21. When a voltage V is applied from a battery (not shown) to the electromagnetic clutch 24 via a relay 25, the electromagnetic clutch 24 is engaged with the engine to actuate the compressor 21; and when the voltage V is not applied, the clutch 24 is disengaged from the engine to deactuate the compressor 21. The temperature sensor 28 detects the temperature of air flowing through the evaporator 22 (referred to as after-evaporator temperature $T_{INT}$).

The engine 10 is provided with an intake air passage 11 and an air bypass passage 13. A throttle valve 12 is disposed in the intake air passage 11 and the ACC valve 14 is disposed in the air bypass passage 13.

The control circuit 31 controls the opening rate of the ACC valve 14 to control the engine idle speed. That is, the engine idle speed can be controlled by adjusting the flow rate of the ACC valve 14 according to the engine operating conditions. The control circuit 31 is connected to the relay 25 for actuating the clutch 24, the temperature sensor 28 for detecting the after-evaporator temperature $T_{INT}$, an air conditioner switch 26 for turning on or off the air conditioner 20, and a fan switch 27 via the switch 26, for controlling the on-off operation and the rotary speed of the blower fan 23, respectively.

The control circuit 31 is a microcomputer composed of a CPU, ROM, RAM and other peripheral devices. In response to the turn-on operations of the air conditioner switch 26 and the blower fan switch 27, the control circuit 31 controls the operation of the compressor 21 and the blower fan 23, and the opening rate of the ACC valve 14, in order to control the idle speed of the engine 10 according to the engine operating condition affected by the air conditioner 20.

The operation of the control system according to the present invention configured as described above will be described hereinbelow in further details. The control circuit 31 controls the operation of the compressor 21 according to the detected after-evaporator temperature $T_{INT}$, by opening the ACC valve 14 to increase the engine idle speed usually when the compressor 21 is kept actuated and by closing the ACC valve 14 not to increase the engine idle speed only where the time interval from when the compressor 21 is deactuated to when actuated is longer than a predetermined value (this indicates a low thermal load applied to the compressor or the engine).

Figure 3:
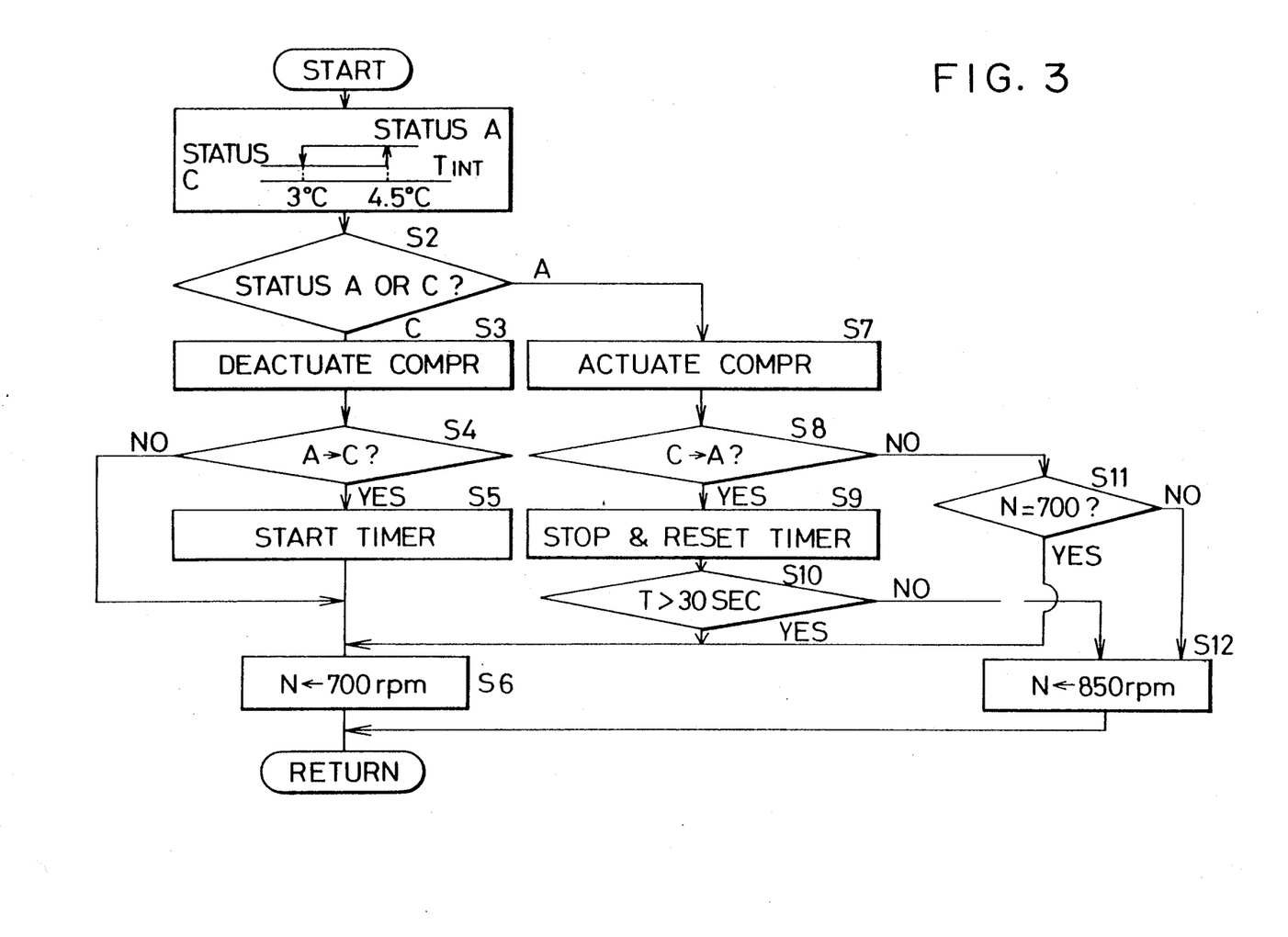
FIG. 3 is a flowchart for assistance in explaining the control of actuating and deactuating a compressor of the control system.
Figure 4:
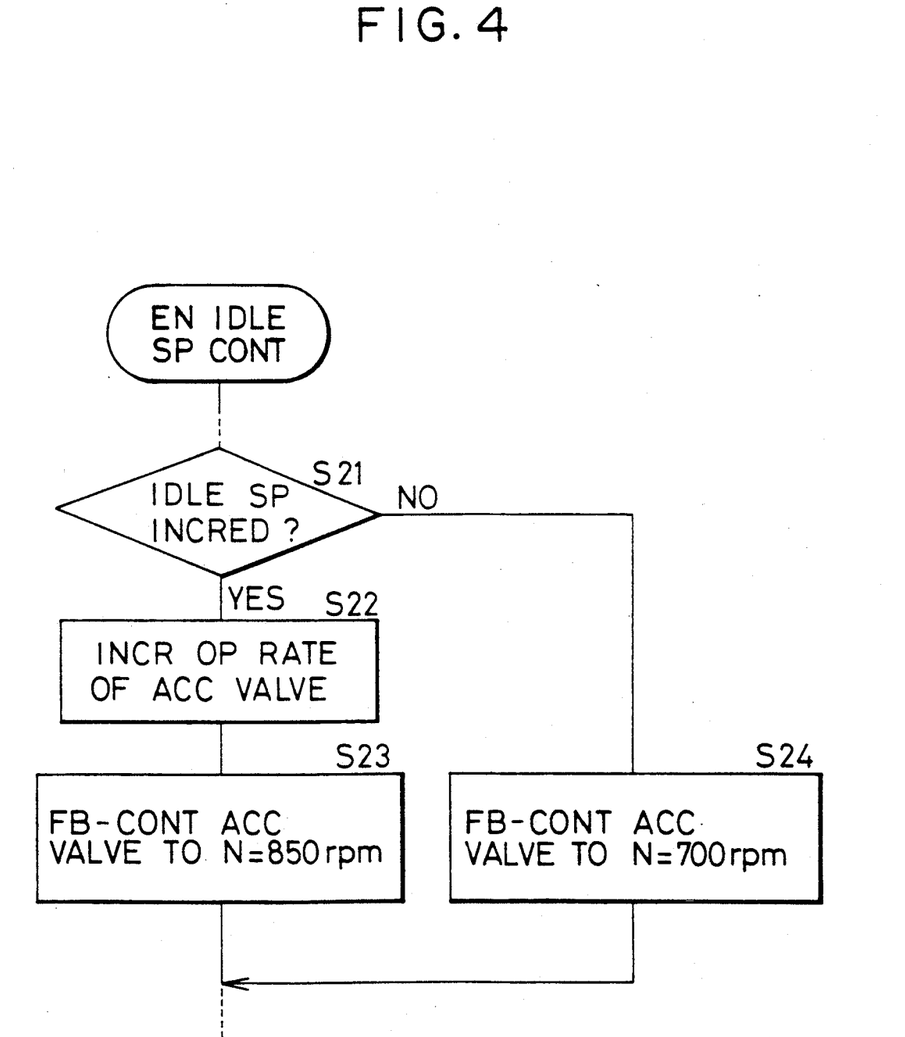
FIG. 4 is a flowchart for assistance in explaining an exemplary control procedure of increasing engine idle speed.

With reference to flowcharts shown in FIG. 3 and 4, the control procedure of the air conditioner 20 and the engine idle speed will be explained in more detail hereinbelow. Here, the air conditioner 20 controls the opening rate of an air mix door on the basis of a detected external air temperature, a detected room temperature, an intensity of light incident upon the vehicle, etc., so that the passenger room temperature can be kept at a set room temperature, as is well known. Therefore, the operation of the air conditioner 20 itself is omitted herein. FIGS. 3 and 4 show only the compressor on-off operation and the engine idle sped increase operation under low-temperature demist control for improving the dehumidification performance at low temperature.

In FIG. 3, control reads the after-evaporator temperature $T_{INT}$ (in step S1) and checks whether the read temperature is high (status A) or low (status C) (in step S2). Here, the status C indicates that the after-evaporator temperature $T_{INT}$ is lower than a first predetermined temperature (e.g. 3° C.) at which the evaporator 22 begins to be frozen, and the status A indicates that the after-evaporator temperature $T_{INT}$ is higher than a second predetermined temperature (e.g. 4.5° C.). If the status C is determined (in step S2), the compressor 21 is deactuated by supplying a signal from the control circuit 31 to the relay 25 to disengage the electromagnetic clutch 24 from the engine 10 (in step S3). Further, control checks whether the present status has been just changed from the status A (high temperature) to the status C (low temperature) (in step S4). If YES, control starts the timer (in step S5) and sets the engine idle speed N to a lower value (e.g. 700 rpm) (in step S6).

If the status A (high temperature) is determined (in step S2). The compressor 21 is actuated by supplying another signal from the control circuit 31 to the relay 25 to engage the electromagnetic clutch 24 with the engine 10 (in step S7). Further, control checks whether the present status has been just changed from the status C (lower temperature) to the status A (higher tempera-ture) (in step S8). If YES, control stops and resets the timer (in step S9), and further checks whether the time measured by the timer exceeds a predetermined time interval (e.g. 30 sec) (in step S10). If YES, since this indicates that the time interval from when the compressor 21 is deactuated to when actuated is relatively long and therefore the thermal load applied to the compressor 21 or the engine 10 is relatively low, control proceeds to the step S6 to set the engine idle speed N to the lower value (e.g. 700 rpm) (in step S6).

Further, if NO in step S10, that is, if the time interval measured by the timer does not exceed the predetermined time interval (e.g. 30 sec), since this indicates that the time interval from when the compressor 21 is deactuated to when actuated is relatively short and therefore the thermal load applied to the compressor 21 or the engine 10 is relatively high, control proceeds to the succeeding step to set the engine idle speed N to a higher value (e.g. 850 rpm) (in step S12).

Further, if NO in step S8, that is, if the present status has not been just changed from the status C (lower temperature) to the status A (higher temperature), control checks whether the engine idle speed N is set to the lower value (e.g. 700 rpm) (in step S11). If YES in step S11, control proceeds to the step S6 to keep the engine idle speed at the lower value (e.g. 700 rpm). If NO in step S11, control proceeds to the step S12 to keep the engine idle speed at the higher value (e.g. 850 rpm).

In the above steps from S7 to S12, only when the compressor 21 has just been actuated (in steps S7 and S8), the idle speed is set to the lower value (N=700 rpm) (in step S6) under the condition that the time interval between the deactuation and actuation of the compressor 21 is longer than the predetermined value (T 30 sec) (i.e. under the lower thermal load) (in step S10). However, when the compressor 21 has already been actuated (in step S8), the idle speed is kept unchanged, because it is unnecessary to change the engine idle speed.

Here, the engine idle speed N =700 rpm is a target idle speed required when the compressor 21 is kept deactuated without increasing the engine idle speed; on the other hand, the engine idle speed N =850 rpm is a target idle speed required when the compressor 21 is kept actuated by increasing the engine idle speed.

FIG. 4 shows a partial procedure of controlling the engine idle speed. Control first checks whether an increase in engine idle speed is required or not (in step S21). If NO, control adjusts the opening rate of the ACC value 14 under feedback control so that the engine idle speed is set to N =700 rpm (in step S24). On the other hand, if YES in step S2, control increases the opening rate of the ACC value 14 by a predetermined value (in step S22) and further adjusts the opening rate of the ACC valve 14 under feedback control so that the engine idle speed is set to N =850 rpm (in step S23).

Figure 5:
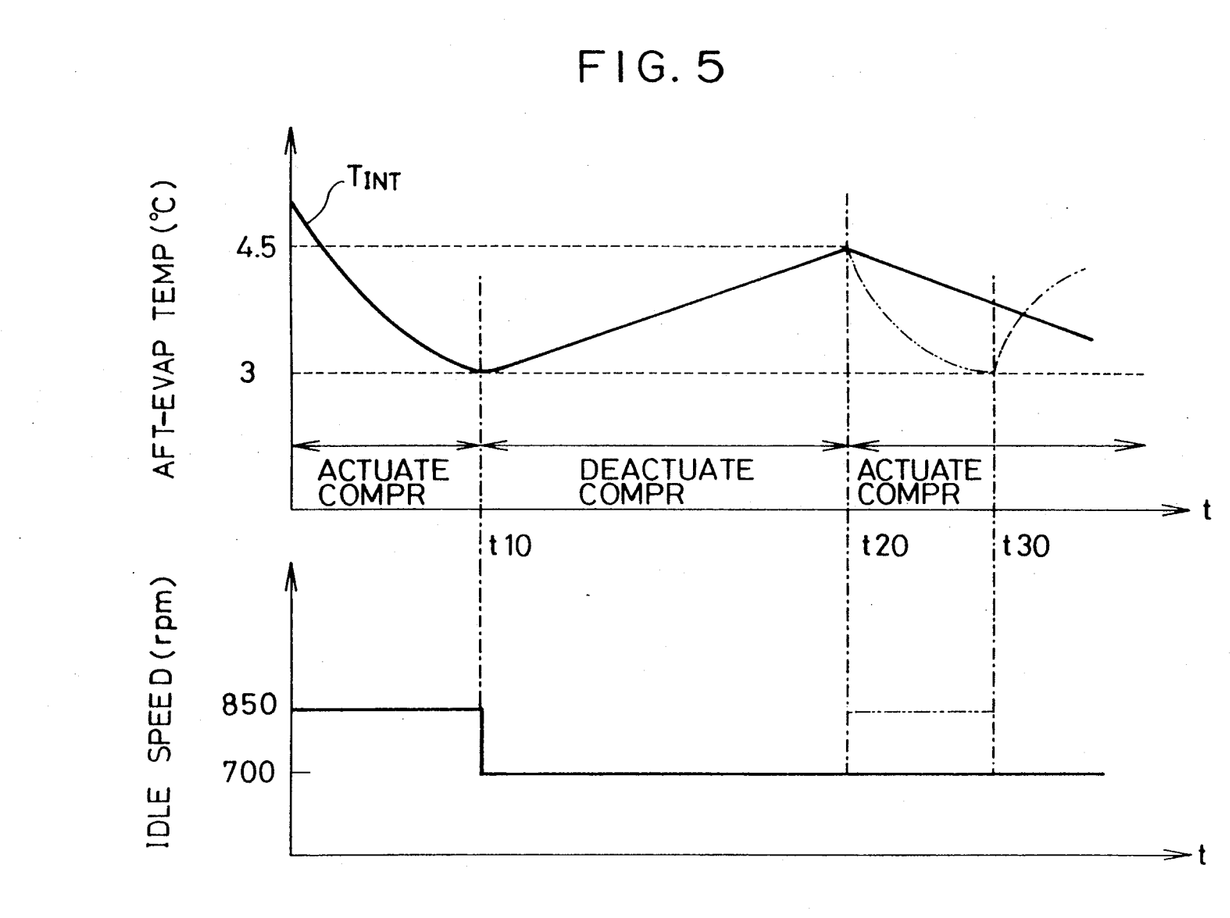
FIG. 5 is a timing chart for assistance in explaining the operation of the embodiment shown in FIG. 2.

FIG. 5 shows a timing chart for assistance in explaining the on-off operation of the compressor 21 in relation to the engine idle speed increase operation. As shown in FIG. 5, when the time interval from when the compressor 21 is deactuated (at the time $t_{10}$) (because the after-evaporator temperature T below 3° C.) to when the compressor 21 is actuated again (at the time $t_{20}$) (because the after-evaporator temperature $T_{INT}$ rises beyond 4.5° C.) exceeds a predetermined value (e.g. 30 sec in this embodiment), since this indicates a relatively low thermal load applied to the compressor 21 or the engine 10, the engine idle speed is not increased even after the compressor 21 has been actuated, thus economizing the fuel or improving the fuel consumption rate. In addition, it is possible to prevent the compressor 21 from being frequently actuated and deactuated, thus improving the durability of the compressor or the air conditioner.

In the case of the prior-art engine idle control system, as shown by dot-dot-dashed lines in FIG. 5, since the engine idle speed is increased whenever the after-evaporator temperature rises beyond 45° C. (at the) time $t_{20}$), the amount of flowing rate of the refrigerant frequently increases and therefore the after-evaporator temperature $T_{INT}$ drops quickly, with the result that the fuel consumption rate is high and additionally the compressor durability is deteriorated. In the present invention, however, since the engine idle speed is not increased at the time $t_{20}$ under a relatively low-thermal load, the after-evaporator temperature $T_{INT}$ drops gradually without repeatedly actuating and deactuating the compressor, so that it is possible to improve the fuel consumption rate and the compressor durability.

In the above-mentioned embodiment, the compressor of fixed capacity type has been explained by way of example. Without being limited thereto, however, it is of course possible to apply the present invention to the automotive vehicle having the air conditioner provided with a compressor of variable capacity type. In the latter case, the amount of refrigerant fed by the compressor is determined to be zero when the after-evaporator temperature drops below a predetermined value and to be a certain value when the same temperature rises beyond another predetermined value, without using the electromagnetic clutch.

As described above, in the engine idle speed control system for an automotive vehicle provided with an air conditioner, in which the compressor is actuated or deactuated near the evaporator freeze limit temperature, according to the present invention, the engine idle speed is increased only when the thermal load applied to the compressor is large as when the time interval between the actuation and deactuation of the compressor is short, but not increased when the thermal load applied to the compressor is small as when the time interval therebetween is long. Therefore, it is possible to reduce the fuel consumption rate and improve the compressor durability, without frequently actuating and deactuating the compressor.

What is claimed is:

1. An engine idle speed control system associated with an air conditioner provided with an evaporator for evaporating a refrigerant compressed by a compressor driven an engine, comprising:
   (a) detecting means for detecting temperature correlative to an evaporator freeze start temperature;
   (b) compressor control means for controlling compressor operation in such a way as not to compress the refrigerant when temperature detected by said detecting means drops belows a predetermined value and to compress the refrigerant when the detected temperature rises beyond the predetermined value;
   (c) idle speed control means for controlling the engine idle speed in such a way as to increase the engine idle speed, when said compressor control means controls the compressor operation so as to compress the refrigerant;
   (d) timer means for measuring a time interval from when the temperature detected by said detecting means drops below the predetermined value to when the detected temperature rises beyond the predetermined value; and
   (e) inhibiting means for inhibiting the engine idle speed from being increased by said idle speed control means when the time interval detected by said timer means exceeds a predetermined value, under the condition that the refrigerant is being compressed by the compressor.

2. The engine idle speed control system of claim 1, wherein said detecting means detect temperature of air having passed through the evaporator.

3. The engine idle speed control system of claim 1, wherein the compressor is of fixed capacity type, and said compressor control means controls the compressor by engaging and disengaging the compressor with and from the engine via an electromagnetic clutch.

4. The engine idle speed control system of claim 1, wherein engine idle speed control means includes an auxiliary air flow rate control valve disposed in an air bypass passage arranged bypassing an air intake passage of the engine.

5. The engine idle speed control system of claim 1, wherein the predetermined temperature value at which the refrigerant is to be compressed or not to be compressed by the compressor has a hysteresis characteristic having a first temperature value at which the actuated compressor is deactuated not to compress the refrigerant and a second temperature value higher than the first temperature value and at which the deactuated compressor is actuated to compress the refrigerant.

6. A method of controlling engine idle speed of an engine associated with an air conditioner provided with an evaporator for evaporating a refrigerant compressed by a compressor driven by the engine, comprising the steps of:
   (a) detecting temperature of air having passed through the evaporator;
   (b) checking whether the detected temperature drops below a first predetermined temperature or rises beyond a second predetermined value higher than the first predetermined value;
   (c) if the detected temperature drops below the first predetermined value, deactuating the compressor;
   (d) checking whether the detected temperature has just dropped below the first predetermined value;
   (e) if the detected temperature has just dropped below the first predetermined value, starting a timer to measure time interval and further setting the engine idle speed to a lower speed;
   (f) if the detected temperature rises beyond the second predetermined value, actuating the compressor;
   (g) checking whether the detected temperature has just risen beyond the second predetermined value;
   (h) if the detected temperature has just risen beyond the second predetermined value, stopping the timer;
   (i) checking whether the time interval measured by the timer is more than a predetermine value;
   (j) if the measured time interval is longer than the predetermined value, keeping the engine idle speed at the lower speed; and
   (k) if the measured time interval is the predetermined value or shorter, setting the engine idle speed to a higher speed.

7. The method of claim 6, wherein if the detected temperature has not just dropped below the first predetermined value in step (d) of claim 6, the engine idle speed is directly set to a lower speed without starting the timer.

8. The method of claim 6, wherein if the detected temperature has not just risen beyond the second predetermined value in step (g) of claim 6, the engine idle speed is kept unchanged.

9. The method of claim 6, wherein the engine idle speed is increased by increasing opening rate of an auxiliary air flow rate control value disposed in an air bypass passage arranged bypassing an intake air of the engine

* * * * *